2,701,472
Patented Feb. 8, 1955

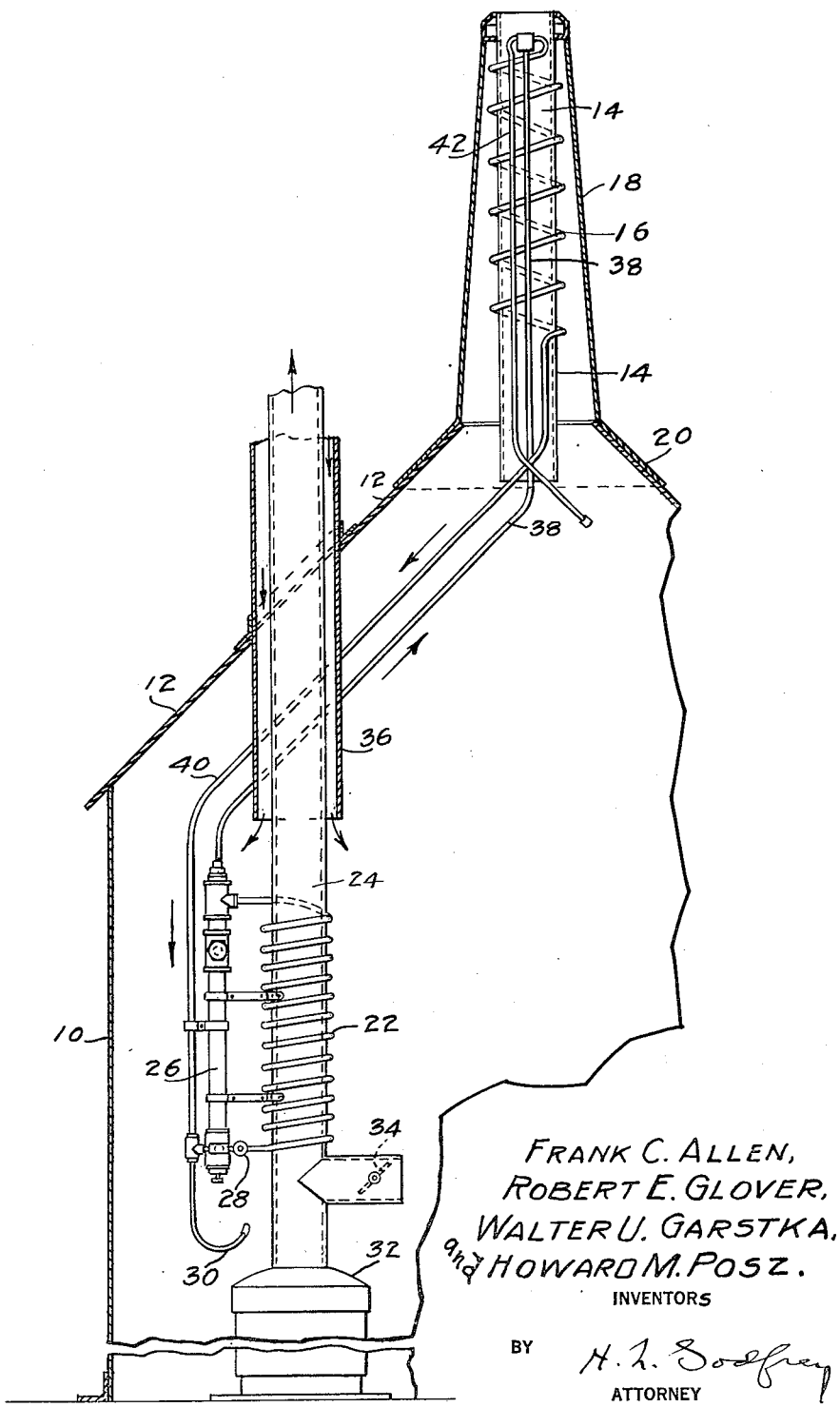
Feb. 8, 1955  F. C. ALLEN ET AL  2,701,472
HEATED PRECIPITATION GAUGE INTAKE TUBE
Filed Oct. 28, 1953
FRANK C. ALLEN,
ROBERT E. GLOVER,
WALTER U. GARSTKA,
and HOWARD M. POSZ.
INVENTORS
BY
ATTORNEY

United States Patent Office

2,701,472

HEATED PRECIPITATION GAUGE INTAKE TUBE

Frank C. Allen, Robert E. Glover, and Walter U. Garstka, Denver, Colo., and Howard M. Posz, North Sacramento, Calif.

Application October 28, 1953, Serial No. 388,928

5 Claims. (Cl. 73—171)

(Granted under Title 35, U. S. Code (1952), sec. 266)

The invention described herein may be manufactured and used by or for the Government of the United States for governmental purposes without the payment to us of any royalty thereon in accordance with the provisions of the act of April 30, 1928 (ch. 460, 45 Stat. L. 467), 35 U. S. C. 266.

This invention relates to precipitation gauges and, more particularly, to an improved precipitation gauge for measuring precipitation under winter conditions or other conditions where the temperature may at times be at or below freezing.

The problem of measurement of winter precipitation is common to the world's temperate zones and is critical in the subarctic and Arctic zones both in the Northern and Southern Hemispheres. The ability of existing installations to measure precipitation other than as rainfall is amply illustrated by data gathered in the higher altitudes of the Rocky Mountains. A series of such comparisons indicated great differences in the catchment of conventional unshielded precipitation gauges as compared with measurements of snow water through soil surveys in the vicinity of the gauges. For example, the gauge in one location caught only 10.4 inches of water equivalent of precipitation during the winter months whereas a snow survey in the vicinity of the gauge disclosed 28.77 inches of snow water equivalent during the same period. The gauge had been plugged by accumulations of snow and ice and failed to show 18.37 inches of water equivalent of winter precipitation. The importance of adequate determination of precipitation for river regulation functions involving irrigation, hydroelectric energy generation, flood control, and other purposes, is such that discrepancies of this order cannot be tolerated.

Accordingly, an object of this invention is to provide an improved means for measuring precipitation under winter conditions.

Another object of the invention is to provide a means for maintaining the intake of a precipitation gauge at temperatures above freezing, thus preventing the adherence of snow and ice crystals to the intake tube.

Another object of the invention is to provide a means for supplying heat to a precipitation gauge whereby heat is provided in just sufficient quantities to prevent adherence of snow and ice crystals to the intake tube of the gauge but not in such quantity as to cause losses by evaporation.

Another object of the invention is to provide a heated precipitation gauge which can be left unattended for a long period of time.

Another object of the invention is to provide a means for measuring precipitation under conditions encountered worldwide, including not only the temperate, subarctic, and Arctic zones of both the Southern and Northern Hemispheres but also at high altitudes in all the continents.

The manner in which the foregoing and related objects are accomplished will be made clear by reference to the ensuing description and accompanying drawing in which:

The sole figure is a fragmentary section of a shelter building incorporating the heated precipitation intake assembly of the invention.

Referring more particularly to the drawing for a detailed description of the invention, there is shown the outline of a shelter house 10, having a conical roof 12 which conveniently may be a type adapted to be set up at an outlying weather station. A metal precipitation gauge intake tube 14 protrudes vertically through a suitable opening in the apex of the conical roof 12. It will be understood that the lower end of the gauge intake tube is normally connected to a gauge device (not shown) which may be either of the non-recording storage type which can be left unattended for long periods of time, of the intensity-recording type which can draw a graph of times of occurrence and of amounts of precipitation, or of an automatic transmitting type adapted to transmit data through wired circuits or by radio.

In accordance with this invention, the gauge intake tube 14 is provided with a heating coil 16 of tubular metal, such as copper, which is wrapped around the intake tube in any suitable manner, and may be fixed thereto, as by soldering or the like. The intake tube and associated heating coil are protected from the weather by an outer metal shell 18, hereinafter designated as a shroud, which may be of frustro-conical shape as shown and is designed to close the opening in the apex of the roof 12 as by means of a tightly fitting flange 20. The shroud is connected to the top of the intake tube by any suitable means and is spaced from the main portion of the intake tube and heating coil as shown. Heat from the coil warms the metal shroud as well as the intake tube and prevents the adherence of ice to the exposed surface.

Heat is supplied to the coil 16 by means of a vapor generator comprising a heat collecting coil 22 wrapped around, or otherwise in heat exchange relation with a section of flue-gas vent tube 24, a liquid accumulator 26, a pressure regulating valve 28, filling tube 30, and suitable connecting tubes and fittings. A space heater 32, preferably of the type utilizing liquified petroleum gas as fuel, provides heat for the flue 24 and may be also utilized to heat the interior of the shelter in order to maintain temperatures sufficiently high to prevent malfunctioning of mechanical and electrical equipment normally contained therein. When the heater is in operation the heat collecting coil 22 receives heat from the hot gases rising through the flue-gas vent pipe. A check damper 34 at the lower end of the heat collecting section, actuated either manually or automatically, controls the amount of heat exchanged. The flue 24 extends through the roof of the shelter and vents to the atmosphere as shown. A concentric pipe 36 may be used to protect the shelter roof from the hot flue 24.

The heat collecting coil 22 and liquid accumulator 26 are filled about three-fourths full of a suitable evaporable liquid such as liquid Freon–114 (dichlorotetra fluoroethane). The heat received from the warm flue gas evaporates some of this fluid and the vapor rises through supply line 38 and enters the top of the heating coil 16 at the precipitation gauge intake tube 14. Vent line 42 at the top of the coil 16 permits the vapors to rise in this manner. If the intake tube is colder than the flue pipe, condensation takes place in the heating coil 16 and the heat of vaporization is released to heat the intake tube. The resulting condensate flows to the bottom of the coil and back to the bottom of the liquid accumulator through return line 40. Accordingly, the intake tube and shroud are heated whenever the space heater functions.

The space heater may be operated either with a small continuous flame or with intermittent heating under thermostatic control in a manner known to the art. In this way the precipitation gauge intake tube is kept free of snow and ice accumulations. The shroud 18 receives some heat from the heating coil 16 and the shelter roof receives some heat from the space heater. Since snow is a poor conductor of heat, any appreciable snow thickness will retard the flow of heat out through the shroud and roof to the extent that these surfaces will rise to the temperature of the melting point. When this occurs any snow accumulations are loosened and slide off leaving the shroud and roof snow free. The inside surface of the precipitation gauge intake tube is likewise kept free of snow and ice accumulation. The heat at the precipitation gauge assists in the assimilation of precipitation gauge catchments by antifreeze charges utilized in the gauge container.

The amount of heat supplied to the heating coil may be at least partially controlled by means of pressure control valve 28. This valve, for example, may be actuated by a diaphragm or bellows in the manner known to the art, and may be connected by capillary tubing to a temperature-sensitive remote-bulb (not shown) mounted near the top of the precipitation intake gauge tube. As the temperature at the top of the precipitation gauge rises to that required for defrosting, the control valve gradually closes and the transfer of heat from the warm flue gases to the precipitation intake gauge is gradually reduced. The valve may be adjusted to assume a position which permits just enough circulation of heating medium to maintain the desired maximum temperature at the gauge intake tube.

Alternatively, the valve 28 may be of the self-contained adjustable pressure regulator type actuated by the vapor pressure developed by the evaporable fluid in the closed system. As the system pressure rises to the vaporable liquid at the temperature required for defrosting the precipitation gauge intake tube, the control valve gradually closes, the flow of evaporable fluid to the heat collector coil is gradually reduced and the transfer of heat from the warm flue gases to the gauge intake tube is gradually reduced to maintain the desired temperature.

It will be understood that many changes can and may be made in the details of the construction and arrangements of the components of the heated precipitation gauge intake assembly without departing from the spirit and scope of the invention. Modifications may be made with reference to the dimensions of the intake and of the heating system for specific operational problems. Various substances may be used to effect the heat transfer from the heat collector to the heating coil. Various methods of applying heat to the heat collector and various prime sources of heat may be used without departing from the scope of the invention. Other methods of control of the amount of heat collected and circulated may be used in lieu of the control valve and check damper or in combination therewith, for either automatic or manual actuation.

It will be appreciated from a reading of the foregoing specification that the invention herein described is susceptible of various changes and modifications without departing from the spirit and scope thereof.

What is claimed is:

1. A precipitation gauge intake assembly comprising in combination an open end metal tube for collecting precipitation adapted to protrude through an opening in the roof of a shelter building, a shroud extending from the top of said metal tube to the roof of the shelter building to thereby shield the opening in the shelter roof and provide a dead air space around the metal tube, and heating means in the space between said tube and shroud to prevent adherence of ice and snow around the precipitation intake.

2. A precipitation gauge intake assembly comprising in combination an open end metal tube for collecting precipitation adapted to protrude through an opening in the roof of a shelter building, a shroud extending from the top of said metal tube to the roof of the shelter building to thereby shield the opening in said roof and to provide a dead air space around the metal tube, heat exchange tubing in said dead air space in contact with said metal tube, and means for supplying a heat exchange medium to said tubing whereby said intake assembly may be heated to prevent adherence of snow and ice.

3. A precipitation gauge intake assembly comprising in combination an open end metal tube for collecting precipitation adapted to protrude through an opening in the roof of a shelter building, a shroud extending from the top of said metal tube to the roof of the shelter building to thereby shield the opening in said roof and to provide a dead air space around the metal tube, heat exchange tubing in said dead air space in contact with said metal tube, means for supplying a heat exchange medium to said tubing, and means for controlling the temperature and circulation of said heat exchange medium whereby said intake assembly may be heated to a temperature just sufficient to prevent adherence of snow and ice.

4. A precipitation gauge intake assembly comprising in combination an open end matal tube for collecting precipitation adapted to protrude through an opening in the roof of a shelter building, a shroud extending from the top of said metal tube to the roof of the shelter building to thereby shield the opening in said roof and provide a dead air space around said metal tube, a heat exchange system adapted to utilize a vaporable fluid, said system including heat exchange tubing in said dead air space, a vapor generator, and means connecting said vapor generator to said heat exchange tubing, whereby vapors from said vapor generator are conveyed to said heat exchange tubing, condense therein, and condensate is returned to said generator.

5. A precipitation gauge intake assembly comprising in combination an open end metal tube for collecting precipitation adapted to protrude through an opening in the roof of a shelter building, a tapered shroud extending from the top of said metal tube to the roof of the shelter building to thereby shield the opening in said roof and provide a dead air space around said metal tube, a heat exchange system adapted to utilize a vaporable fluid, said system including heat exchange tubing in said dead air space, a vapor generator, means connecting said vapor generator to said heat exchange tubing whereby vapors from said vapor generator are conveyed to said heat exchange tubing, condense therein, and the condensate is returned to said generator, a gas-operated heater in said shelter building including an outlet flue, a heat exchange coil around said outlet flue, and means connecting said heat exchange coil to said vapor generator, whereby heat absorbed from said flue is conveyed to said precipitation intake tube to thereby prevent the adherence of snow and ice to said intake assembly.

References Cited in the file of this patent

UNITED STATES PATENTS

| Number | Name | Date |
|---|---|---|
| 1,173,022 | Patterson | Feb. 22, 1916 |
| 1,236,381 | Rogers | Aug. 7, 1917 |
| 2,213,888 | Ross | Sept. 3, 1940 |
| 2,541,512 | Hahn | Feb. 13, 1951 |